July 11, 1950     R. C. NIERSTE     2,514,787
BRINE OVERFLOW ATTACHMENT FOR ICE CREAM FREEZERS
Filed June 20, 1947     2 Sheets-Sheet 1

Inventor
Raymond C. Nierste

By *Clarence A. O'Brien and Harvey B. Jacobson*
Attorneys

July 11, 1950 R. C. NIERSTE 2,514,787
BRINE OVERFLOW ATTACHMENT FOR ICE CREAM FREEZERS
Filed June 20, 1947 2 Sheets-Sheet 2

Inventor

Raymond C. Nierste

By *Clarence A. O'Brien*
and *Harvey B. Jacobson*
Attorneys

UNITED STATES PATENT OFFICE 2,514,787

BRINE OVERFLOW ATTACHMENT FOR ICE-CREAM FREEZERS

Raymond C. Nierste, Vincennes, Ind.

Application June 20, 1947, Serial No. 756,025

1 Claim. (Cl. 62—114)

The present invention relates to new and useful improvements in ice cream freezers and more particularly to a brine overflow attachment for the freezer.

An important object of the present invention is to provide a device of this character whereby the brine and water escaping from the overflow opening at the upper portion of a freezer may be collected and prevented from escaping on to the floor while the freezer is in operation.

A further object of the invention is to provide a brine overflow attachment for ice cream freezers which may be easily and quickly attached to a conventional freezer without necessitating any changes or alterations in the construction thereof.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
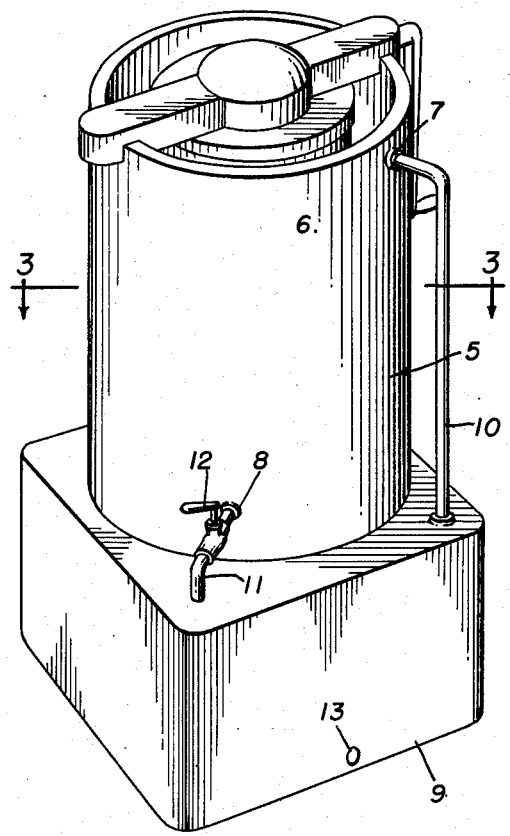
Figure 1 is a perspective view illustrating one embodiment of this invention.
Figure 2:
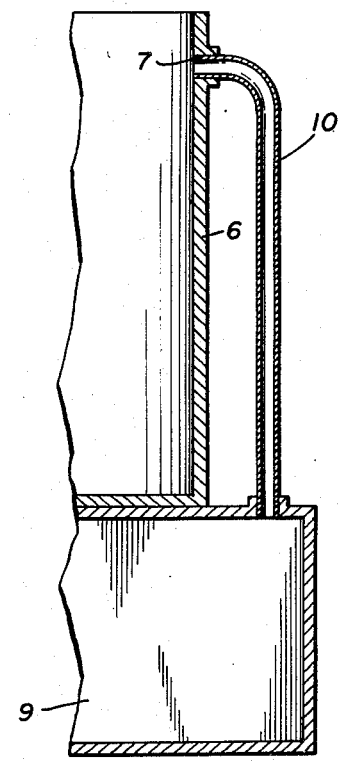
Figure 2 is a fragmentary vertical sectional view.
Figure 3:
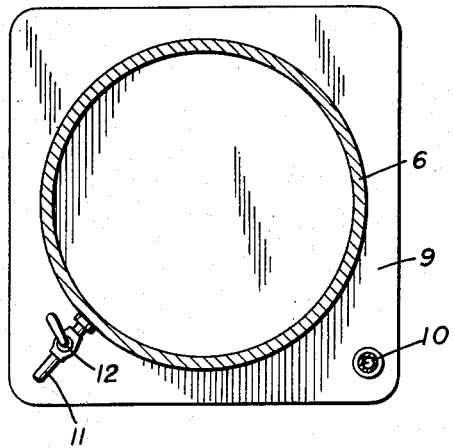
Figure 3 is a horizontal sectional view taken on the line 3—3 of Figure 1.

Referring now to the drawings in detail and first with respect to the form of the invention illustrated in Figures 1 to 3 inclusive the numeral 5 designates an ice cream freezer of conventional construction and which may be of a manually operated or power operated type and which includes the outer bucket 6 having an upper drain opening 7 and a lower drain opening 8.

In order to prevent the free escape of the brine from the bucket 6 I provide a hollow base or tank 9 on which the bucket 6 rests, the top of the tank having a drain pipe 10 extending upwardly from one corner thereof and connected to the upper drain opening 7 of the bucket.

A second drain pipe 11 also extends upwardly from the tank 6 adjacent one corner thereof and is connected to the lower drain opening 8 and the pipe 11 is provided with a conventional form of valve 12.

In the operation of the freezer the melting of the ice in the bucket 6 raises the level of the water and brine contained therein and the liquid overflows into the pipe 10 and is collected in the tank 9. When it is desired to drain the bucket 6 the valve 12 is opened and the entire liquid is then drained into the tank 9.

The lower portion of the tank 9 is also provided with a drain plug 13.

Figure 4:
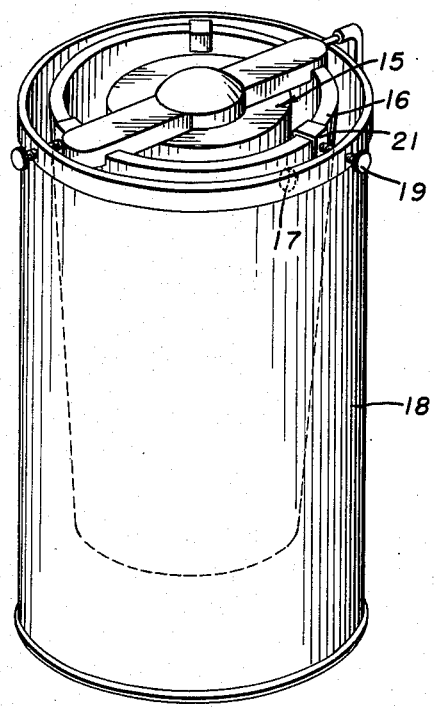
Figure 4 is a perspective view of a modified form of the invention.
Figure 5:
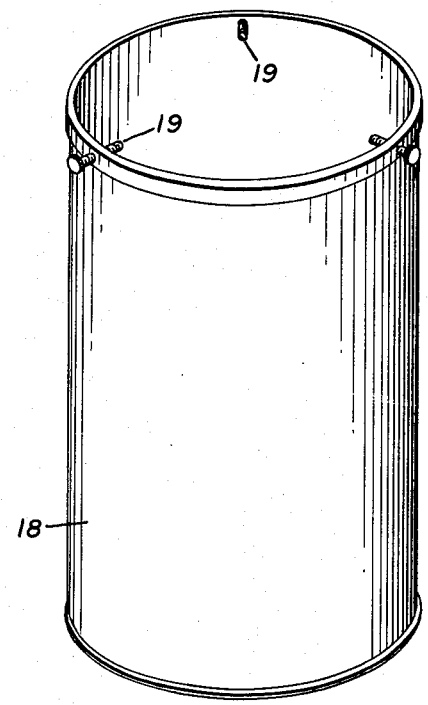
Figure 5 is a similar view of the brine collecting container removed from the refrigerator.
Figure 6:
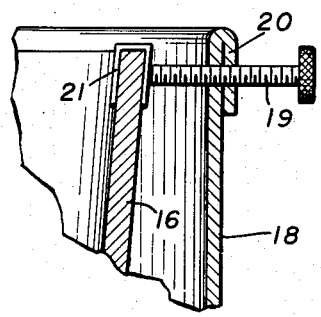
Figure 6 is an enlarged fragmentary sectional view showing one of the clamping screws for securing the brine collecting container to the upper edge of an ice cream freezer.

In the form of the invention illustrated in Figures 4 to 6 inclusive the ice cream freezer designated generally at 15 is also provided with a bucket 16 having a drain opening 17 adjacent its upper portion.

The ice cream freezer and bucket 16 is placed in an open container 18 of a height greater than the height of the bucket 16 and the bucket is supported in a suspended position in the container 18 and in spaced relation from the walls of the latter by a plurality of clamping screws 19 which are threaded through a rim 20 at the upper edge of the container and with the inner ends of the screws bearing tightly against clips 21 suitably secured to the edge of the bucket 16 to prevent injury to the bucket.

Accordingly the water and brine overflowing from the opening 17 will be connected in the container 18.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A brine overflow for an ice cream freezer having an outer brine containing bucket having an overflow opening comprising a container, and means suspending the freezer in the container, said means comprising clips fixed over the rim of the bucket and screws threaded through the walls of the container and against said clips.

RAYMOND C. NIERSTE.

REFERENCES CITED

The following references are of record in the file of this patent:

UNITED STATES PATENTS

| Number | Name | Date |
|---|---|---|
| 1,039,655 | Dickson | Sept. 24, 1912 |
| 1,081,790 | Thompson | Dec. 16, 1913 |